US008190595B2

(12) United States Patent
Bruno et al.

(10) Patent No.: US 8,190,595 B2
(45) Date of Patent: May 29, 2012

(54) FLEXIBLE QUERY HINTS IN A RELATIONAL DATABASE

(75) Inventors: Nicolas Bruno, Redmond, WA (US); Ravishankar Ramamurthy, Redmond, WA (US); Surajit Chaudhuri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 507 days.

(21) Appl. No.: 12/413,544

(22) Filed: Mar. 28, 2009

(65) Prior Publication Data
US 2010/0250518 A1    Sep. 30, 2010

(51) Int. Cl.
*G06F 17/30* (2006.01)
(52) U.S. Cl. ......... 707/713; 707/718; 707/719; 707/798
(58) Field of Classification Search .................. 707/713, 707/718, 719, 798
See application file for complete search history.

(56) References Cited

U.S. PATENT DOCUMENTS

| | | | |
|---|---|---|---|
| 5,822,749 A | 10/1998 | Agarwal | |
| 5,940,819 A * | 8/1999 | Beavin et al. ......................... | 1/1 |
| 6,397,206 B1 | 5/2002 | Hill et al. | |
| 6,618,719 B1 * | 9/2003 | Andrei .................. | 1/1 |
| 6,704,724 B1 | 3/2004 | Ellmann et al. | |
| 6,813,617 B2 | 11/2004 | Wong et al. | |
| 7,363,289 B2 | 4/2008 | Chaudhuri | |
| 2004/0019587 A1 * | 1/2004 | Fuh et al. .......................... | 707/2 |
| 2005/0004892 A1 * | 1/2005 | Brundage et al. .................. | 707/3 |
| 2005/0050016 A1 * | 3/2005 | Stanoi et al. ...................... | 707/3 |
| 2005/0262046 A1 | 11/2005 | Day et al. | |
| 2006/0224563 A1 | 10/2006 | Hanson | |
| 2008/0010240 A1 * | 1/2008 | Zait .................................... | 707/2 |
| 2008/0091647 A1 * | 4/2008 | Gao Zhong et al. .............. | 707/2 |
| 2010/0005077 A1 * | 1/2010 | Krishnamurthy et al. ........ | 707/4 |

OTHER PUBLICATIONS

IBM, "Overview of Optim Query Tuner and Optim Query Workload Tuner," 2007, Online Publication.*
IBM, "DB2 Version 9 for Linux, UNIX, and Windows: Optimizer profiles and guidelines overview," May 9, 2008, Online Publication.*
Oracle, "Oracle Database Performance Tuning Guide," Mar. 2008, Online Publication.*
Taniar et al., "The Use of Hints in SQL-Nested Query Optimization," Jun. 15, 2007, Elsevier Inc.*
Billings, K., A TPC-D model for database query optimization in cascades, MS Thesis, Portland State University, 1997.

(Continued)

*Primary Examiner* — Srirama Channavajjala
*Assistant Examiner* — Grace Park
(74) *Attorney, Agent, or Firm* — Lyon & Harr, L.L.P.; Craig S. Fischer

(57) ABSTRACT

A flexible query hints system and method for discovering and expressing query hints in a database management system. Embodiments of the flexible query hints system and method include a power hints (Phints) language that enables the specification of constraints to influence a query optimizer. Phints expressions are defined as tree patterns annotated with constraints. Embodiments of the flexible query hints system and method also include techniques to incorporate the power hints language expressions into an extended query optimizer. Theses techniques include computing a directed acyclic graph for Phints expression, deriving candidate matches using the Phints expression and the graph, computing candidate matches, and extracting a revised execution plan having a lowest cost and satisfying constraints of the Phints expression. Embodiments of the flexible query hints system and method include a flexible query hint user interface that allow users to interactively adjust query hints.

20 Claims, 10 Drawing Sheets

OTHER PUBLICATIONS

Börzsönyi, S., D. Kossmann, K. Stocker, The Skyline operator, Proc. of the 17th Int'l Conf. on Data Eng'g., Apr. 2001, pp. 421-430, Heidelberg, Germany.

Bruno, N., R. V. Nehme, Configuration-parametric query optimization for physical design tuning, Proc. of the ACM SIGMOD Int'l Conf. on Management of Data, Jun. 2008, pp. 941-952, Vancouver, BC, Canada.

Christodoulakis, S., Implications of certain assumptions in database performance evaluation, ACM Trans. Database Syst., Jun. 1984, vol. 9, No. 2, pp. 163-186.

Graefe, G., The Cascades framework for query optimization, IEEE Data Eng. Bull., Sep. 1995, vol. 18, No. 3, pp. 19-29.

Neumann, T., G. Moerkotte, An efficient framework for order optimization, Proc. of the 20th Int'l Conf. on Data Eng'g., pp. 461-472, Mar.-Apr. 2004, Boston, MA, USA.

Oracle, Optimizer hints, Oracle Database Performance Tuning Guide, retrieved Nov. 19, 2008 from http://stanford.edu/dept/itss/docs/oracle/10g/server.101/b10752/hintsref.htm.

O'Reilly Media, More on query optimization for Oracle databases, retrieved Nov. 19, 2008 from http://www.codewalkers.com/c/a/Database-Articles/More-on-Query-Optimization-for-Oracle-Databases/.

Patel, B. A., Forcing Query Plans, SQL Server Technical Article, Nov. 2005.

Progress Software, Progress® DataXtend™ CE for C#, 2005.

Selinger, P. G., M. M. Astrahan, D. D. Chamberlin, R. A. Lorie, T. G. Price, Access path selection in a relational database management system, Proc. of the 1979 ACM SIGMOD Int'l Conf. on Management of Data, pp. 23-34, May 30-Jun. 1, 1979, Boston, Massachusetts.

Stackedoverflow.com, What are "SQL-Hints"?—Stack Overflow, retrieved Nov. 19, 2008 from http://stackoverflow.com/questions/262004/what-are-sql-hints.

Transaction Processing Performance Council, TPC-H, retrieved Nov. 19, 2008 from http://www.tpc.org/tpch/.

W3C, XQuery 1.0 and XPath 2.0 Data Model (XDM), retrieved Nov. 19, 2008 from http://www.w3.org/TR/2007/REC-xpath-datamodel-20070123/.

* cited by examiner

FLEXIBLE QUERY HINTS IN A RELATIONAL DATABASE

BACKGROUND

Relational database management systems (DBMSs) allow a user to specify queries using high level declarative languages. These queries are specified in a declarative manner, where the query is set forth but no detailed algorithm of how to obtain the results is outlined. A query optimizer in DBMSs translates the declarative query in a specified algorithm called a query execution plan. An efficient query execution plan is select by query optimizers to evaluate an input query. Selection of the execution plan is performed using a cost model that estimates the resources that are needed for each alternative plan in consideration.

Cost models for query optimizers typically are quite sophisticated and complex. While the cost model can often by used to select a good query execution plan for a given query, there are situations in which the cost model does not come up with a good execution plan. Because of its complexity, it is well known that cost models can be inherently inaccurate due to several factors. For example, factors such as erroneous cardinality estimates, inaccurate calibration constants used for costing, simplified cost formulas that miss some details, state runtime parameters that affect the execution costs of queries, and the effect of concurrent query executions all can lead to errors and inaccuracies in the optimizer cost model.

It will thus be appreciated that query optimizers do not always produce optimal query execution plans. In fact, for complex queries, query optimizers may even return plans that are decisively poor In such situations, many DBMSs allow a user (typically a database administrator) to manually adjust and correct the wrong choices that led the query optimizer to select such a poor query execution plan. To aid the database administrator, DBMSs include (to varying degrees) a mechanism called query hinting. Query hinting allows database administrator to influence the choice of the best query execution plan through query hints. In general, query hints instruct the query optimizer to constrain its search space to a certain subset of execution plans. Two ways that this can be achieved by specifying an access path for a table (in other words, force the use of an index for a particular table) or by forcing the join order of the plan based on the order of the tables listed in a Structured Query Language (SQL) string.

One problem is that there is not a unified abstraction of hints within any single DBMS. The existing set of hints supported by each DBMS is largely a toolkit of techniques that are considered important and that have been incorporated in its optimizers. This is because the hints do not express certain constraints of the structure of the execution plan, such as when trying to force an early pre-aggregation below a join. In many cases, the granularity at which hints constrain the search space is either too coarse, which effectively prevents experienced database administrators from fine-tuning a poorly optimized query, or instead requires a fully specified execution plan, which might be too inflexible and tedious for all but the simplest queries.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the flexible query hints system and method use a query hints language that enables the specification of rich constraints to influence a query optimizer to select better query execution plans. As stated above, commercial database systems expose query hints to address situations in which the query optimizer selects a poor execution plan for a given query. However, current query hints are not flexible enough to deal with a variety of non-trivial scenarios.

Embodiments of the flexible query hints system and method include a power hints (or "Phints") language. The Phints language is a small language used to specify rich constraints over the query optimizer's search space of query execution plans. Phints expressions are defined as tree patterns annotated with constraints. A directed acyclic graph is used to graphically represent a Phints expression. A subplan in the graph matches a Phints tree pattern if certain conditions are met. In addition, each node in the tree pattern can be annotated with various constraints. These constraints include a "Self-Constraint", which is a predicate that must be satisfied in the graph, and a "Subtree Constraint", which is a predicate that must be satisfied by each descendant of a node mapping in the graph. Another constraint available in the Phints language is an "Order constraint", which returns node mappings in a precise ordering.

The Phints language also includes a concise syntax for specifying Phints expressions that is linearized and can be appended to a structured query language (SQL) query string in the same way as current query hints. A set of conventions are used, such that the tree pattern is written in infix order, using parenthesis to denote parent-child relationships, or square brackets if the order constraint is present in the parent node. Moreover, if there are no self constraints, the node is denoted with the "*" symbol. In addition, subtree constraints are written in curly braces next to the node description.

Embodiments of the flexible query hints system and method also include techniques to incorporate the power hints language expressions into an extended query optimizer. This extended query optimizer uses these techniques to use the Phints expressions. Generally, the evaluation of a Phints expression can be done by enumerating all possible execution plans in the directed acyclic graph, filtering out any alternatives that do not match the Phints expression, and returning the matching query execution plan having with the smallest estimated cost. The cost is estimated using an optimizer cost model.

Embodiments of the flexible query hints system and method also include a flexible query hint user interface. This interface allows a user to interactively adjust the query hints. The query execution plan is presented to the user on the user interface in a graphical manner, such that the user can quickly determining whether he is satisfied with the plan. If not, then the user can alter the constraints of the Phints expression using the user interface. In particular, constraints can be added or removed and the new execution plan can be executed on the user interface. All the while the current query execution plan is displayed graphically to help the user discover a satisfactory query execution plan.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of the flexible query hints system and method reference is made to the accompanying drawings, which form a part thereof, and in which is shown by way of illustration a specific example whereby embodiments of the flexible query hints system and method may be practiced. It is to be understood that other embodiments may be utilized and structural changes may be made without departing from the scope of the claimed subject matter.

I. System Overview

Figure 1:
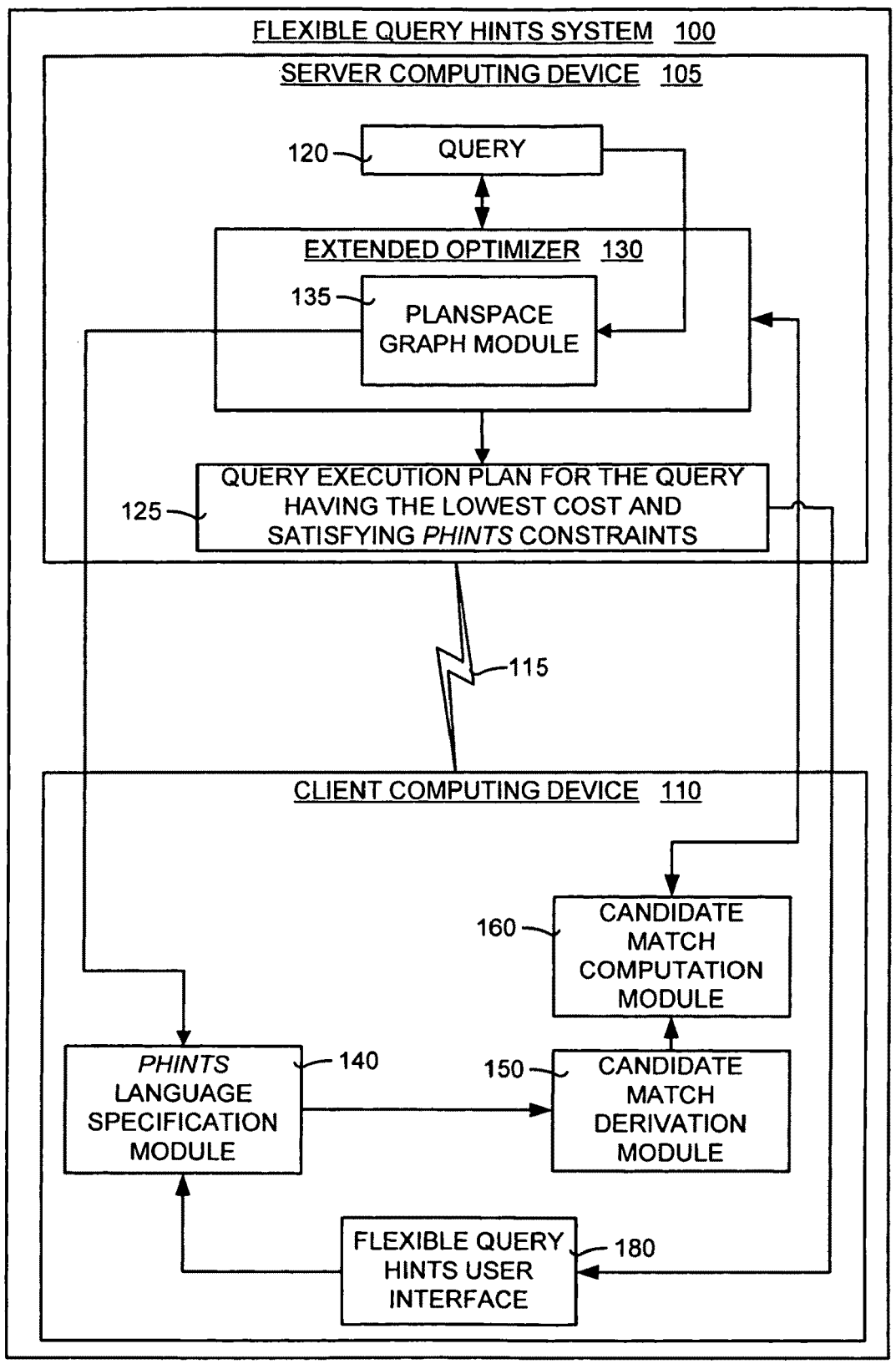
FIG. 1 is a block diagram illustrating a general overview of embodiments of the flexible query hints system and method disclosed herein.

FIG. 1 is a block diagram illustrating a general overview of embodiments of the flexible query hints system and method disclosed herein. It should be noted that the implementation shown in FIG. 1 is only one of many implementations that are possible. Referring to FIG. 1, a flexible query hints system 100 is shown implemented on a server computing device 105 and a client computing device 110. It should be noted that the computing devices 105, 110 may include a single processor (such as a desktop or laptop computer) or several processors and computers connected to each other. The server computing device 105 and the client computing device 110 communicate over a communications network 115.

In general, embodiments of the flexible query hints system 100 inputs a query 120, processes the query 120, and outputs an execution plan for the query that has a lowest cost and satisfies certain constraints 125. The query typically is a query that a database administrator is unhappy with and would like to improve by using query hints. Embodiments of the flexible query hints system 100 provide a way for this to occur.

Embodiments of the flexible query hints system 100 include an extended optimizer 130 and a planSpace graph module 135 located on the extended optimizer 130. The planSpace graph module 135 takes the query 120 and returns its corresponding planSpace graph. As explained below, this planSpace graph is a directed acyclic graph. Note that the extended optimizer 130 and the planSpace graph module 135 reside on the serving computing device 105. The planSpace graph is produced as a result of the query optimization, which occurs at the server computing device 105. The client computing device 110 includes a Phints language specification module 140, a candidate match derivation module 150, and a candidate match computation module 160. An extended optimizer 130 includes a planSpace graph module 135, which takes the query 120 and returns its corresponding planSpace graph. As explained below, this planSpace graph is a directed acyclic graph. Note that the extended optimizer 130 and the planSpace graph module 135 reside on the serving computing device 105.

A session in the flexible query hints system 100 is typically initiated when the database administrator decides to tune the execution plan of a problematic query. At this point, the client computing device 110 the extended optimized a single time, and the planSpace graph module 135 in the extended optimizer 130 generates the planSpace graph corresponding to the query.

The database administrator then uses the Phints language specification module 140 to constrain the query 120. The Phints language is discussed in more detail below. Typically, the database administrator, based on knowledge about the application, the runtime system, and the current execution plan, decides to constrain the query 120 by creating Phints expressions or modifying previously submitted Phints expressions.

Once a Phints expression has been created, the candidate match derivation module 150, the candidate match computation module 160, and the extended optimizer 130 are used to find the query execution plan having a lowest cost and that satisfies the Phints constraints 125. The candidate match derivation module 150, the candidate match computation module 160, and the extended optimizer 130 are all discussed in detail below.

The resulting execution plan 125 can optionally be sent to the server and executed to obtain feedback on cost, cardinality, and runtime characteristics. In addition, embodiments of the flexible query hints system 100 include a flexible query hints user interface 180. Embodiments of the user interface 180 graphically displays the resulting plan, along with any optional feedback from an actual execution. Embodiments of the user interface 180 allow the side-by-side comparison of multiple execution trees resulting from previous Phints expressions. This comparison can help determine whether a good execution plan has been identified or whether additional iterations are needed.

II. Operational Overview

Figure 2:
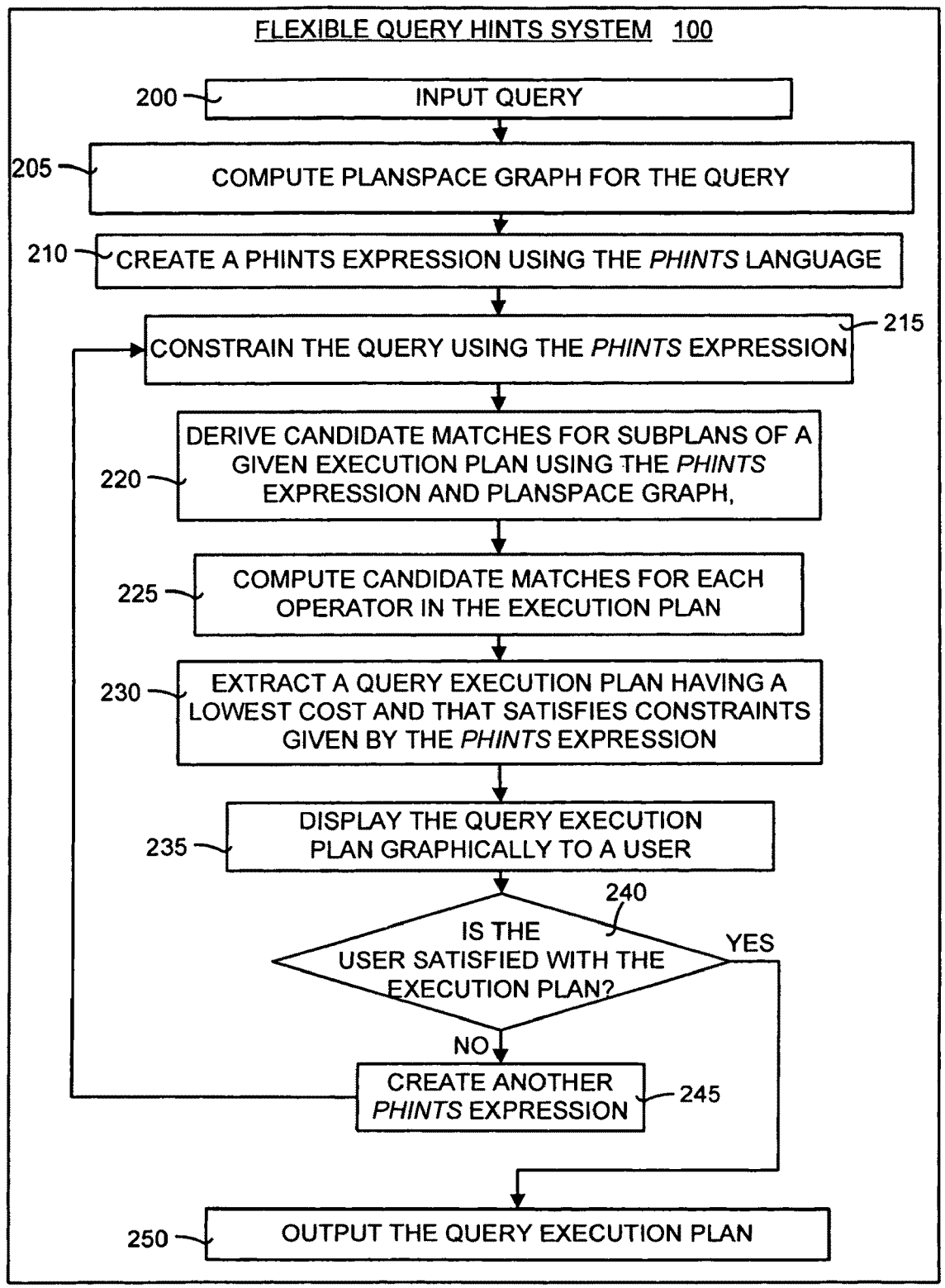
FIG. 2 is a flow diagram illustrating the operation of embodiments of the flexible query hints system and method shown in FIG. 1.

FIG. 2 is a flow diagram illustrating the operation of embodiments of the flexible query hints system 100 and method shown in FIG. 1. In general, embodiments of the flexible query hints method input a query and output a query execution plan having a lowest cost and satisfying constraints of at least one Phints expression. Embodiments of the method use the methods of the planSpace graph module 135, the Phints language specification module 140, the candidate match derivation module 150, the candidate match computation module 160, the extended optimizer 130, and the flexible query hints user interface 180.

Referring to FIG. 2, the method begins by inputting a query (box 200). The system 100 then computes a planSpace graph for the query (box 205). The planSpace graph is discussed in detail below. A user, typically a database administrator, then creates at least one Phints expression using the Phints language (box 210). The Phints language also is discussed in further detail below.

Next, the user constrains the query using the Phints expression (box 215). The system 100 then uses the query and the Phints expression to generate the desired query execution plan. In particular, the system 100 first derives candidate matches for sub-plans of a given execution plan using the Phints expression and the planSpace graph (box 220). Next, candidate matches are computed for each operator in the execution plan (box 225).

Several different execution plans are examined, and the system 100 extracts the query execution plan having a lowest cost while still satisfying the constraints given by the Phints expression (box 230). The extracted query execution plan ten is displayed to a user in a graphical fashion (box 235). This display enables a user to determine whether the plan meets the objectives of the user. A determination then is made as to whether the user is satisfied with the extracted execution plan (box 240). If not, then the user creates another Phints expression and the process begins again (box 245). If the user is satisfied, then the extracted query execution plan is output (box 250). In some embodiments the extracted execution plan is executed by the database management system.

III. Operational Details

The operational details of embodiments of the flexible query hints system 100 and method now will be discussed. These embodiments include embodiments of the planspace graph module 135, the Phints language specification module 140, the candidate match derivation module 150, the candidate match computation module 160, the extended optimizer 130, and the flexible query hints user interface 180, all shown in FIG. 1. The operational details of each of these programs modules now will be discussed in detail.

III.A. PlanSpace Graph Module

The details of the planSpace graph module 120 and its operation, along with some preliminary concepts and notation, will be discussed to make the subsequent discussion clearer.

III.A.1. PlanSpace Graph

The flexible query hints system 100 and method models hints as constraints over the search space of execution plans considered by the query optimizer. Preparatory to discussing the details of the flexible query hints system 100 and method model, an abstract representation of such search space will be described. The general idea of the planspace graph module 135 is to compactly represent the very large set of possible execution plans by sharing as much structure as possible.

Specifically, the space of plans of a given query can be modeled by using a directed acyclic graph. In this document, this type of directed acyclic graph is referred to as planSpace graph. A planSpace graph contains two kinds of nodes, which are denoted OP and OR nodes. Each OP node in a planSpace graph corresponds to a specific operator in an execution plan (such as a hash-join operator), and all of its children (if any) are OR nodes. In turn, each OR node in a planSpace graph corresponds to a set of equivalent alternatives that can be used interchangeably to form execution plans, and every one of its children (there is at least one) are OP nodes.

Figure 3:
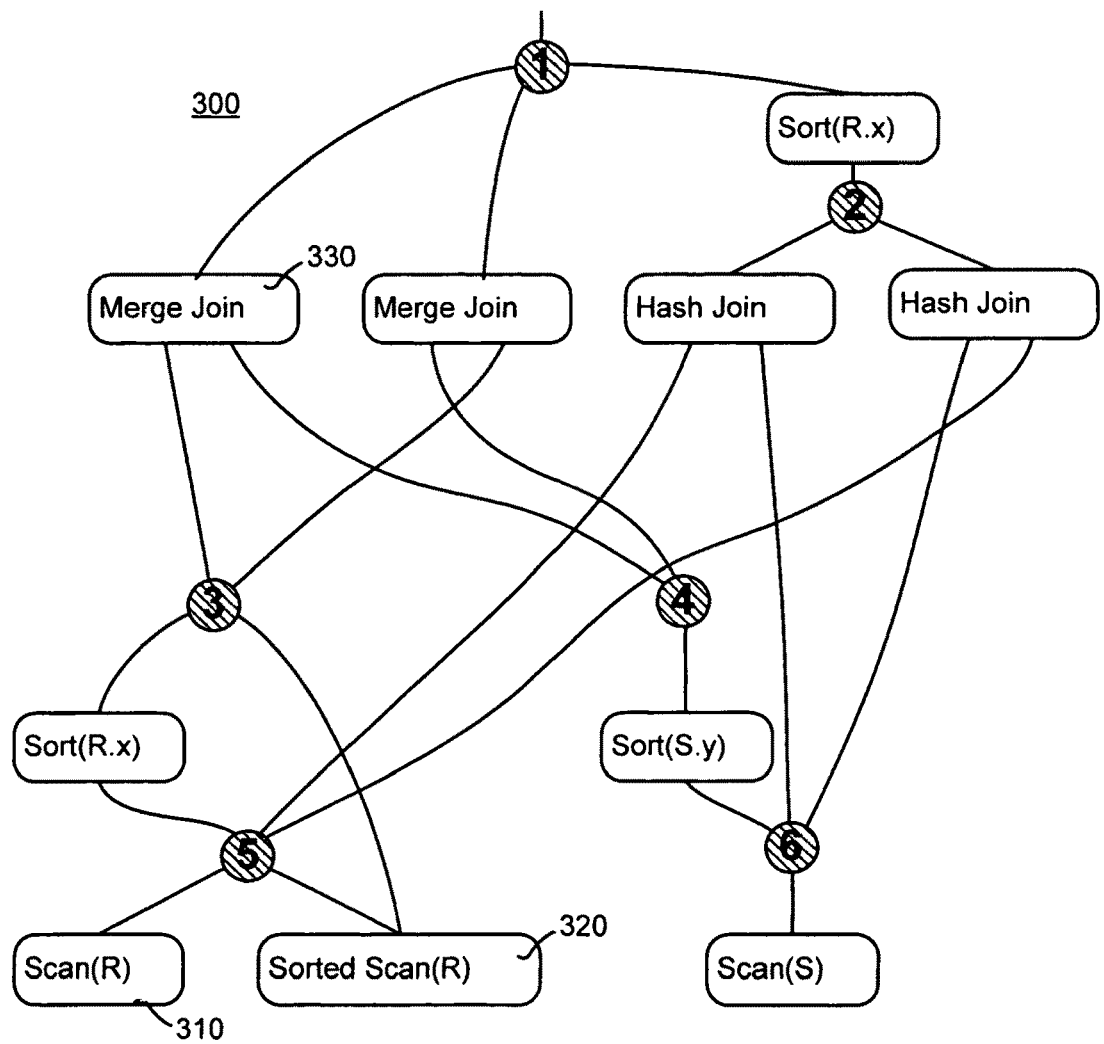
FIG. 3 is an exemplary example of a directed acyclic graph (or planSpace graph) of the search space.

FIG. 3 is an exemplary example of a directed acyclic graph (or planSpace graph) of the search space. In particular, FIG. 3 illustrates a planSpace graph 300 for the query:

SELECT * FROM R, S
WHERE R.x = S.y
ORDER BY R.x

In FIG. 3, OR nodes are represented by shaded circles (numbered 1 to 6), and OP nodes are represented by boxes that contain the specific operators in the tree. At the bottom of FIG. 3 there are two OP nodes that return tuples from R. The first OP node, Scan(R) 310, traverses the primary index in the relation and returns tuples in a non-specific order. The second OP node, Sorted Scan(R) 320, traverses a covering index with clustering key column x and therefore returns tuples sorted by x. The OR node that is labeled #5 in FIG. 3 represents all alternative ways to return tuples from R. In turn, the OR node that is labeled #3 represents alternative ways of returning tuples of R in x order. The rationale for considering such OR node is that the left-most merge join operator in FIG. 3 requires tuples sorted by the join columns, and thus cannot be directly connected with the OR node #5. OR node #3 then has two children: an explicit Sort operator whose child is OR node #5, and the original Sorted Scan(R) operator that already returns tuples in the right order and for which the additional sort would be redundant. The remainder of the graph can be analyzed similarly up to the root, which is an OR node that compactly represents all possible execution plans for the input query.

Note that this graph model is general enough to be mapped to the search space of different optimizers that are commonly used in commercial systems. Given a planSpace graph, it is possible to generate any execution plan by traversing the graph and picking one child for each OR node and all children for each OP node. The role of the optimizer is then to consider all execution plans induced by the planSpace graph and to pick the query execution plan with the least execution cost.

III.A.2. Cost Model

Consider an OP node N. Each of N's children (if any) are OR nodes whose children by definition return the same result. Therefore, the cost of any query execution sub-plan rooted at N is the sum of costs of its children plus a local processing cost, which is independent of the choices below N. Consider the Merge Join node 330 on the left side of FIG. 3. No matter what choice is made for the left input (OR node #3) or the right input (OR node #4), the Merge Join 330 operator locally does the same amount of work.

The cost model of an optimizer therefore approximates the local processing time for each possible operator in the graph. It essentially associates, with each OP node N, a real number LC(N), that corresponds to the local execution time of the corresponding operator. Obtaining the cost of the best execution sub-plan rooted at each node N in the planSpace, denoted BC(N), can be done using the equation:

$$BC(N) = \begin{cases} LC(N) + \sum_{N_i} BC(N_i) & \text{if } N = OP(N_1, \ldots, N_k) \\ \min_{N_i} BC(N_i) & \text{if } N = OR(N_1, \ldots, N_k). \end{cases}$$

The definition of BC satisfies the well-known principle of optimality, which states that every sub-plan of an optimal plan is itself optimal. The best node N is obtained using the equation:

$$BP(N) = \begin{cases} OP_N(BP(N_1), \ldots, BP(N_k)) & \text{if } N = OP(N_1, \ldots, N_k) \\ BP(\text{minarg}_{N_i} BC(N_i)) & \text{if } N = OR(N_1, \ldots, N_k) \end{cases}$$

where $OP_N$ is the operator associated with an OP node N, and minarg returns the $N_i$ that minimizes value $BC(N_i)$.

In this conceptual model, current query hints can be seen as constraining the search space of plans (or the planSpace graph) that is considered by the optimizer. By way of example, the hint OPTION (HASH JOIN) would essentially remove from the original planSpace graph any OP node that is associated with a non hash-based join implementation, and would return the best execution plan out of that subgraph (if at least one such alternative exists).

III.B. Power Hints (Phints) Language Specification Module

As discussed earlier, there is no uniform abstraction that can cover the set of query hints in current systems. The Phints language specification module 140 includes a simple query hinting language that can provide such an abstraction and at the same time is richer than existing query hints. The language is designated as Power Hints, or Phints for short.

III.B.1. Phints Expressions

Phints expressions are defined as tree patterns annotated with constraints. Conceptually, the evaluation of Phints expressions can be done by enumerating all possible execution plans in the planSpace graph, filtering out the alternatives that do not match Phints expressions, and finally returning the matching query execution plan with the smallest estimated cost.

Figure 4:
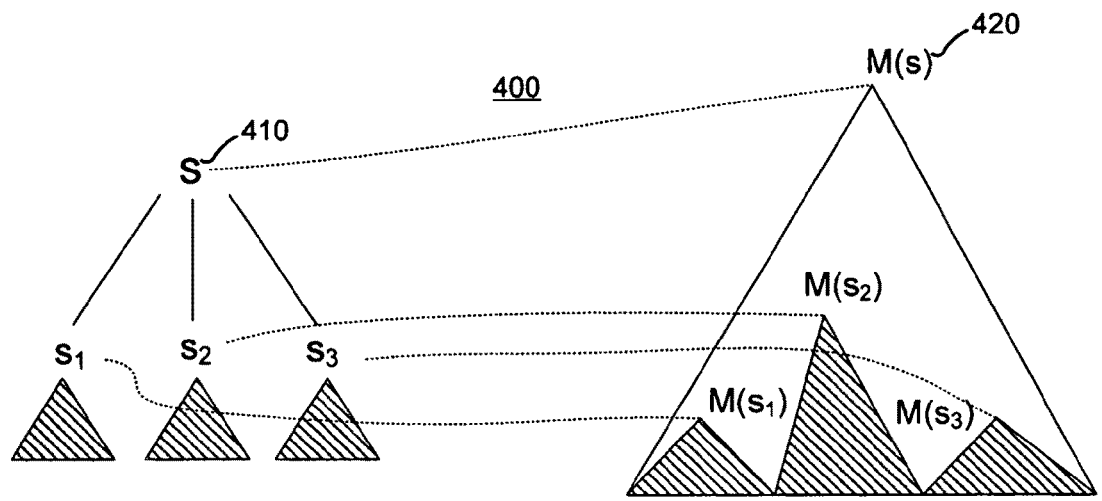
FIG. 4 illustrates a graphical representation of a pattern match in the Phints language.

FIG. 4 illustrates a graphical representation 400 of a pattern match in the Phints language. In particular, a subplan P in the planSpace graph matches a Phints tree pattern S 410 if there is a mapping M 420 between nodes in S 410 and distinct OP nodes in P such that:
1) For each leaf node s in S 410, M(s) 420 is a leaf node in P (and those are the only leaf nodes in P);
2) For each internal node s in S 410 with children $\{s_i, \ldots, s_k\}$, every $M(s_i)$ is a descendant of M(s) 420, and no $M(s_i)$ is a descendant of $M(s_j)$ for $i \neq j$; and,
3) For each node s in S 410, M(s) 420, and its descendants in P, must satisfy the constraints defined on s.

Specifically, each node s in a tree pattern S 410 can be optionally annotated with various constraints. One of the constraints is called a "Self-Constraint", which is a predicate that must be satisfied in the planSpace graph. Another constraint is called a "Subtree Constraint", which is a predicate that must be satisfied by each descendant of M(s) 420 in the planSpace graph. Yet another constraint available in the Phints language is called an "Order constraint", where, if an order constraint is present, an in-order traversal of the planSpace graph returns $M(s_1), \ldots, M(s_k)$ in that precise order.

Predicates in self-constraints and subtree-constraints for node s include a "force(A)", which specifies that the matching M(s) 420 must have A as the associated implementation algorithm (such as force(Hash Join)). Another predicate is "disable(A)", which specifies that the matching M(s) 420 cannot have A as the implementation algorithm. Another predicate is "condForce($A_L, A_P$)", which specifies that the matching M(s) 420 must use $A_P$ as the implementation algorithm but only if M(s) 420 is of type $A_L$. By way of example, a join operator can be forced to be hash-based by condForce(Join, Hash Join)). Another predicate is "forceTable(T)", where T is a table, which specifies that the matching node M(s) 420 must be a leaf node that operates over $T^3$.

III.B.2. Concisely Expressing Phints Expressions

This section describes a concise syntax for specifying Phints expressions that is linearized and can be appended to a structured query language (SQL) query string in the same way as current query hints. Note that the following conventions are used. First, the tree pattern is written in infix order, using parenthesis to denote parent-child relationships, or square brackets if the order constraint is present in the parent node. Second, if there are no self constraints, the node is denoted with the symbol *. Otherwise, the node is denoted with A for a force(A) self-constraint, !A for a disable(A) self-constraint, T for a forceTable(T) constraint, and L=>P for a CondForce(L,P) constraint. Third, subtree constraints are written in curly braces next to the node description.

Figure 5:
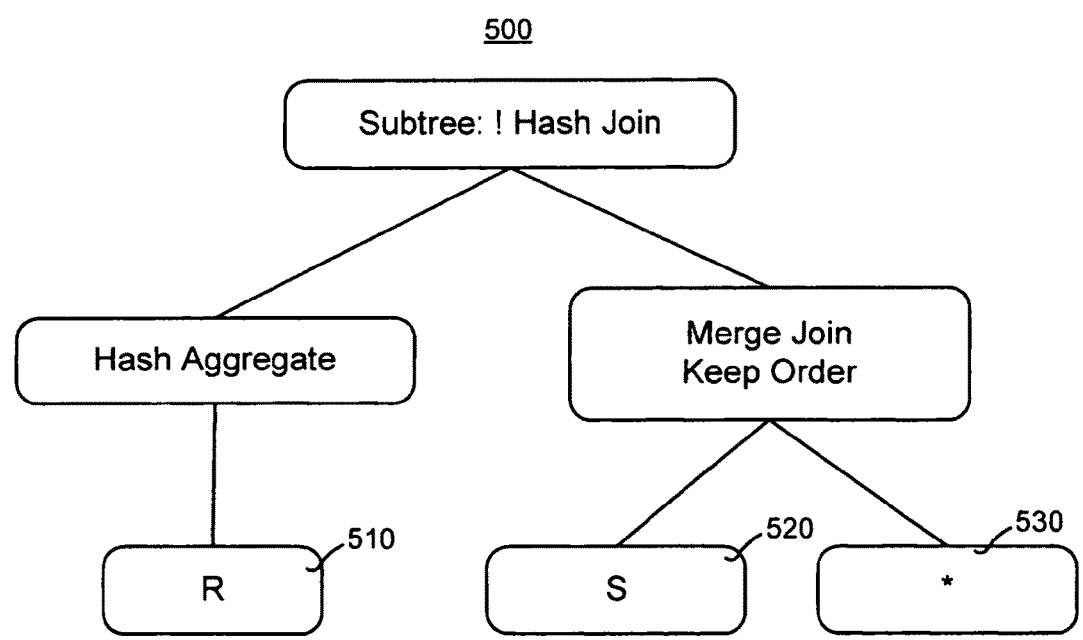
FIG. 5 is an exemplary example that illustrates a graphical representation of a Phints expression.

FIG. 5 is an exemplary example that illustrates a graphical representation of a Phints expression. In particular, FIG. 5 shows a sample tree expression 500 that illustrates the features of the language, and would match any execution subplan that: (1) is a three-way join between tables R 510, S 520, and some other table in the query 530; (2) has no join that is hash-based; (3) the inner join is merge-based between S and the remaining table in that order; and, (iv) there is an early pre-aggregation on table R. Using the above notation, The Phints expression shown in FIG. 5 can be written as:

*{!HashJoin}(HashAggregate(R), MergeJoin[S,*])

In other embodiments, it is possible that alternative linearized representations can be generated, such as the following XML-based representation for the constraint above:

```
<Op SubTree="!HashJoin">
    <Op Self="HashAggregate">
        <Op Table="R"/>
    </Op>
    <Op Self="Merge Join" Ordered="True">
        <Op Table="S"/>
        <Op Table="*"/>
    </Op>
</Op>
```

III.B.3. Additional Examples

Additional examples that further illustrate the capabilities of Phints expressions will now be introduced. First, it will be shown how some of the common hints supported by the current systems fit naturally in the framework of the flexible query hints system 100 and method. Next, more complex scenarios are outlined that can be easily specified in Phints, but may not be supported by most current systems.

As a first exemplary example, consider the OPTION (HASH JOIN) hint used in above to force all joins to be hash based. This can easily be specified in the Phints language as:

*{Join=>Hash Join}(R,S,T).

As a second exemplary example, consider a join of four tables R, S, T and U. Moreover, suppose that it is required that the tables to be joined in that particular order. Some commercial systems support the ability to specify a join order in the final plan based on the syntactic order of the tables in the input SQL statement (such as OPTION(FORCE ORDER)). Any arbitrary join tree can easily be specified using Phints expressions, such as:

*[R,*[*[S,T], U]].

Note, however, that there are two interesting generalizations of this pattern. First, certain join implementations can be forced for some nodes, others can be disabled, and a third group can be left unspecified (so that the optimizer finds the best alternative). This can be expressed as a Phints expression as:

HashJoin[R,*[!NLJoin[S,T],U]].

Second, by specifying the expression *[R,S,T,U], any execution plan P can be matched that joins only these four tables, and for which an in-order traversal of the nodes returns the tables in the correct order, is valid (such as (R,(S,T),U), (R,(S,(T, U))), (((R,S),T), U)).

As a third exemplary example, note that some systems support the specification of a table to be the first one in the join order. For instance, if it is desired that the optimizer pick a plan that uses R as the initial joined table, the following Phints expression can be used:

*[R,*,*,8].

Again, note that more complex interactions can be specified with Phints expressions, such as:

*[*(R,S),*,*], which instructs the optimizer to pick a join order that "begins" with tables R and S (in some order), and then joins the result with the remaining tables.

As a fourth exemplary example, suppose that in the previous example R is a fact table and the remaining tables are dimension tables. Further, suppose that a user wants to force a plan that joins the dimension tables first (possibly using Cartesian products) and then uses an index to access the fact table. This plan is interesting since it avoids scanning the large fact table R. At the same time, however, it is not desirable to explicitly specify the ordering of the dimension tables. This type of plan can be specified using the following Phints expression:

IndexNestedLoops[*(*,*,*),R].

III.C. Evaluating Phints Expressions

This section discusses the way in which the flexible query hints system 100 and method obtain the most efficient execution plan in a planSpace graph subject to Phints constraints. First, the notion of a candidate match is introduced, which keeps track of partial matches between nodes in Phints expressions and those in the planSpace graph. Next, it is shown how a candidate matches are computed bottom-up in a planSpace graph. As used in this document, the phrase "bottom up" means that the computation of candidate matches proceeds from the leaf nodes in the planSpace towards the root note. Next, original dynamic programming algorithm is reviewed to obtain the best execution plan under no constraints, and then a discussion of why the principle of optimality, which is valid in the original formulation, does not hold under such constraints. Finally, the notion of interesting matches is introduced to address this problem along with the way in which Phints expressions are evaluated.

III.C.1. Candidate Matches

Consider a Phints expression *[R,S,T] and an execution subplan, $P=R \bowtie S$.

Although the subplan does not match the full expression, it does so "partially," since further joining P with table T would result in a match as described in the previous section. It should be noted that, $R \bowtie T$ is not a partial match. A mechanism, therefore, is needed to refer to and reason with such partial matches. Consider a tree pattern S and a subplan P. A candidate match between P and S is defined as (s, c), where s is a node in S and $c=\{s_1, \ldots, s_k\}$ is an ordered subset of children of s, such that:

1) There exist k disjoint subtrees of P, $\{p_1, \ldots, p_k\}$, such that each $p_i$ matches $s_i$ as in the definition set forth above.
2) If s has an order constraint, then an in-order traversal of P returns $p_1, \ldots, p_k$ in this order, and $\{s_1, \ldots, s_k\}$ is a subsequence of children(s), and there are no "gaps" in $s_i$.
3) If $\{s_1, \ldots, s_k\}$ cover all of s' children, then P matches s as in the definition set forth above.

Figure 6:
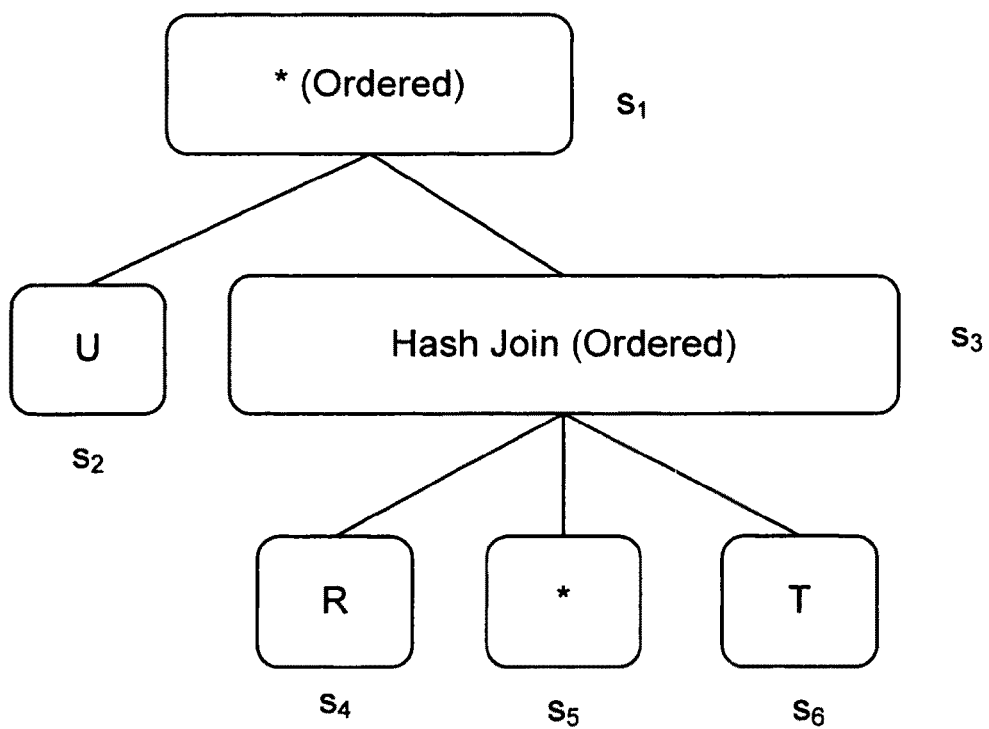
FIG. 6 illustrates an exemplary example of a Phints expression S
Figure 7:
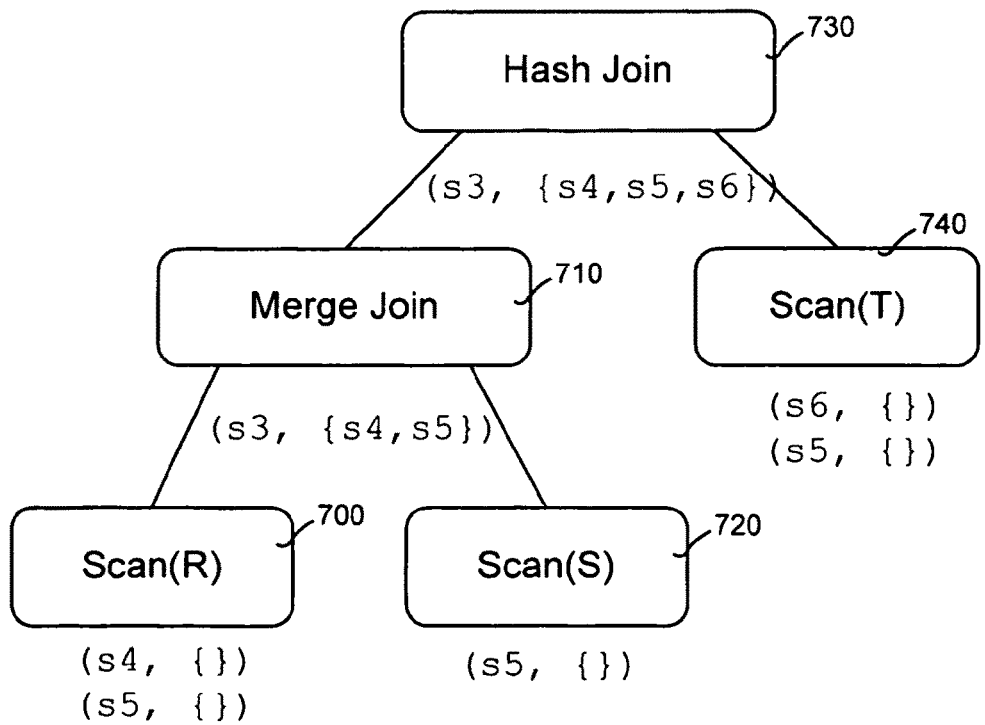
FIG. 7 illustrates the execution subplan P of the sub-expression shown in FIG. 6.

FIGS. 6 and 7 illustrate an exemplary example of candidate matches in Phints. FIG. 6 illustrates an exemplary example of a Phints expression S. In this exemplary example shown in FIG. 6, the sub-expression is HashJoin[R,*,T]. FIG. 7 illustrates the execution subplan P of the sub-expression shown in FIG. 6. As shown in FIG. 7, below each node in the execution plan are shown the candidate matches of the operator. For instance, the candidate matches for Scan(R) 700 are both ($s_4$, { }) and ($s_5$, { }). In general, the candidate matches for a leaf node L in an execution plan are all ($s_i$, { }) for leaf nodes $s_1$ in the Phints expression for which: (i) L satisfies $s_1$'s self-constraints; and, (ii) the subtree-constraints of all $s_1$'s ancestors.

Referring to FIGS. 6 and 7, the Merge Join 710 operator matches ($s_3$, $\{s_4, s_5\}$) because: (i) subtrees Scan(R) 700 and Scan(S) 720 match $s_4$ and $s_5$, respectively; (ii) the order of children is preserved without gaps; and, (iii) since $s_6$ is not a match, it is not necessary to additionally satisfy the Hash Join self-constraint on $s_3$. By a similar reasoning, it can also be shown that the Hash Join operator 730 matches both $s_3$ and all its children $\{s_4, s_5, s_6\}$.

III.C.2. Computing Candidate Matches

This section describes how to compute all candidate matches in a planSpace graph bottom up using the candidate match derivation module 150, the candidate match computation module 160, and the extended optimizer 130. First, it is shown a candidate match for a node can be derived given matches for each of its children. Next, it is shown how to compute all candidate matches.

III.C.2.a. Candidate Match Derivation Module

In general, embodiments of the candidate match derivation module 150 derive candidate matches of a given query execution subplan. Note that for a node n in a tree, parent(n), children(n), and isRoot(n) are used to denote, respectively, the parent of n, the children of n, and whether n is the root of the tree. To further simplify the notation, the operation of deriving a candidate match uses m.s and m.c to denote the node and ordered set of children of a given candidate match m.

Figure 8:
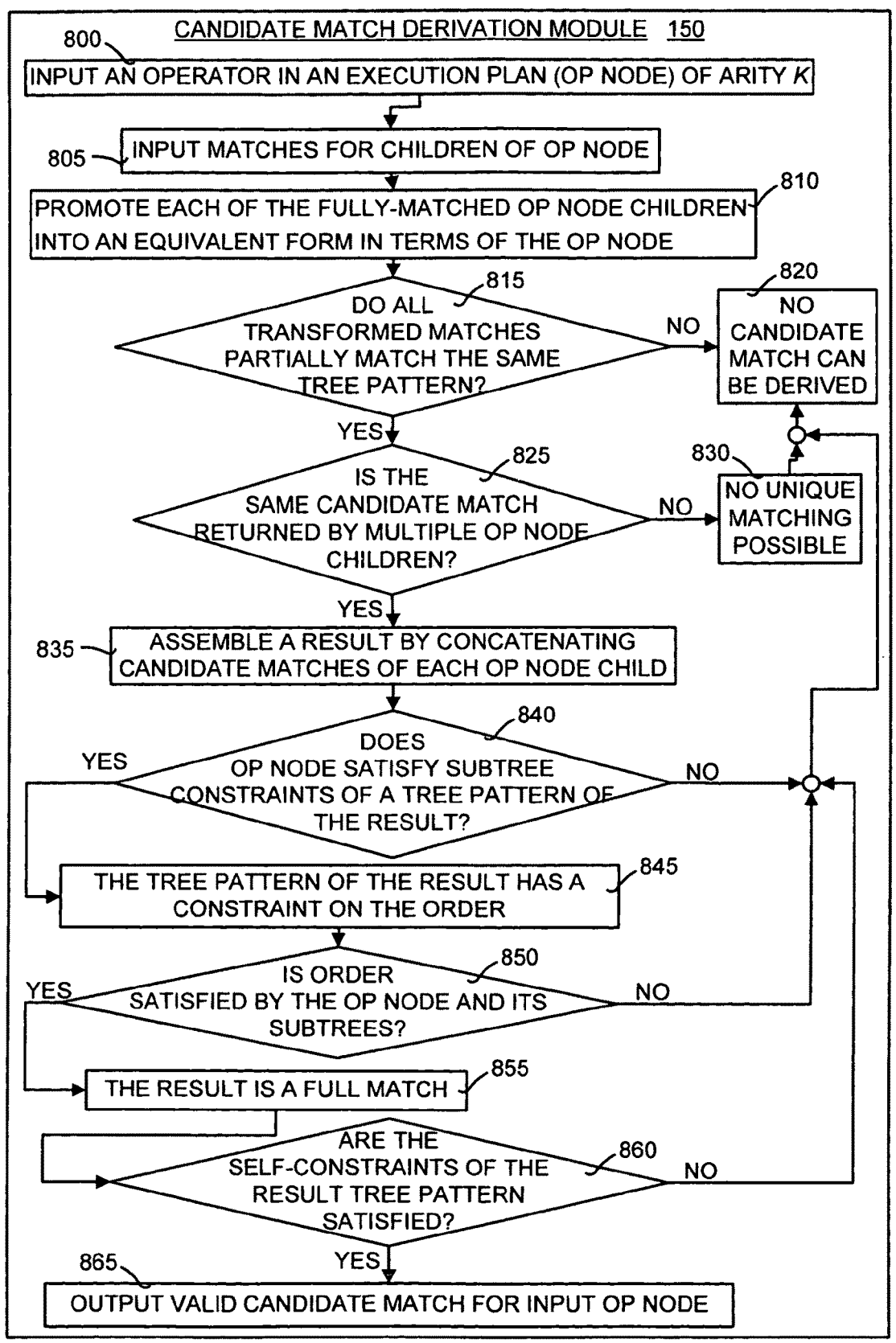
FIG. 8 is a flow diagram illustrating the detailed operation of embodiments of the candidate match derivation module shown in FIG. 1.

Consider an OP node A with arity k in a given execution plan, and suppose that each $m_i(i \leq k)$ is a candidate match of the i-th child of A. Then, the candidate match derivation module 150 returns the corresponding match for A (if any) based on matches of A's children. In particular, FIG. 8 is a flow diagram illustrating the detailed operation of embodiments of the candidate match derivation module 150 shown in FIG. 1. The operation begins by inputting an operator in a given execution plan (box 800). In other words, an OP node of arity k is input. Next, the module 150 inputs matches for the children of the input OP node (box 805).

The module 150 then promotes of the fully matched children into an equivalent form in terms of the parent node (box 810). For the exemplary example of FIGS. 6 and 7, this process action would convert (s3, {s4, s5, s6}) into (s1, {s3}), but would keep (s3, {s5, s6}) unchanged. The module 150 then determines whether all transformed matches ($m_i$) at least partially match the same tree pattern (mi.s) (box 815). If not, then no candidate match can be derived (box 820).

If all transformed matches do at least partially match the same tree pattern, then the module 150 determines whether the same candidate match is returned by multiple children (box 825). If not, then no unique mapping is possible (box 830), and no candidate match can be derived (box 820). Otherwise, the mapping is a unique mapping.

Next, the module 150 assembles the result (rm) by concatenating the candidate matches of each OP node child ($m_i$) (box 830). Next, the module 150 determines whether the OP node satisfies subtree constraints of a tree pattern (rm.s) of the result (box 840). If not, then there is no candidate match that can be derived (box 820). If the subtree constraints are satisfied, then the tree pattern of the results does have an order constraint (box 845).

The module 150 then determines whether an order is satisfied by the OP node and its subtrees (box 850). If not, then there is no candidate match that can be derived (box 820). Otherwise, the result is a full match (box 855). The module 150 then makes a determination as to whether the self-constraints of the tree pattern of the result are satisfied (box 860). If not, then there is no candidate match that can be derived (box 820). If so, then the output of the candidate match derivation module 150 is a valid candidate match for the input OP node (box 865).

By way of example, consider matches (s3, {s4, s5}) and (s6, { }) for the Merge Join 710 and Scan(T) 740 operators in FIG. 7. Processing by the module 150, where the OP node is the Hash Join node 730 in FIG. 7, would first promote (s6, { }) into (s3, {s6}) but would leave (s3, {s4, s5}) unchanged. Both matches then would share the same tree node (s3) and would have disjoint children subsets. The new match is assembled as (s3, {s4, s5, s6}), and since it satisfies all self-constraints and subtree constraints, is therefore returned as a match for the OP node itself.

III.C.2.b. Candidate Match Computation Module

Figure 9:
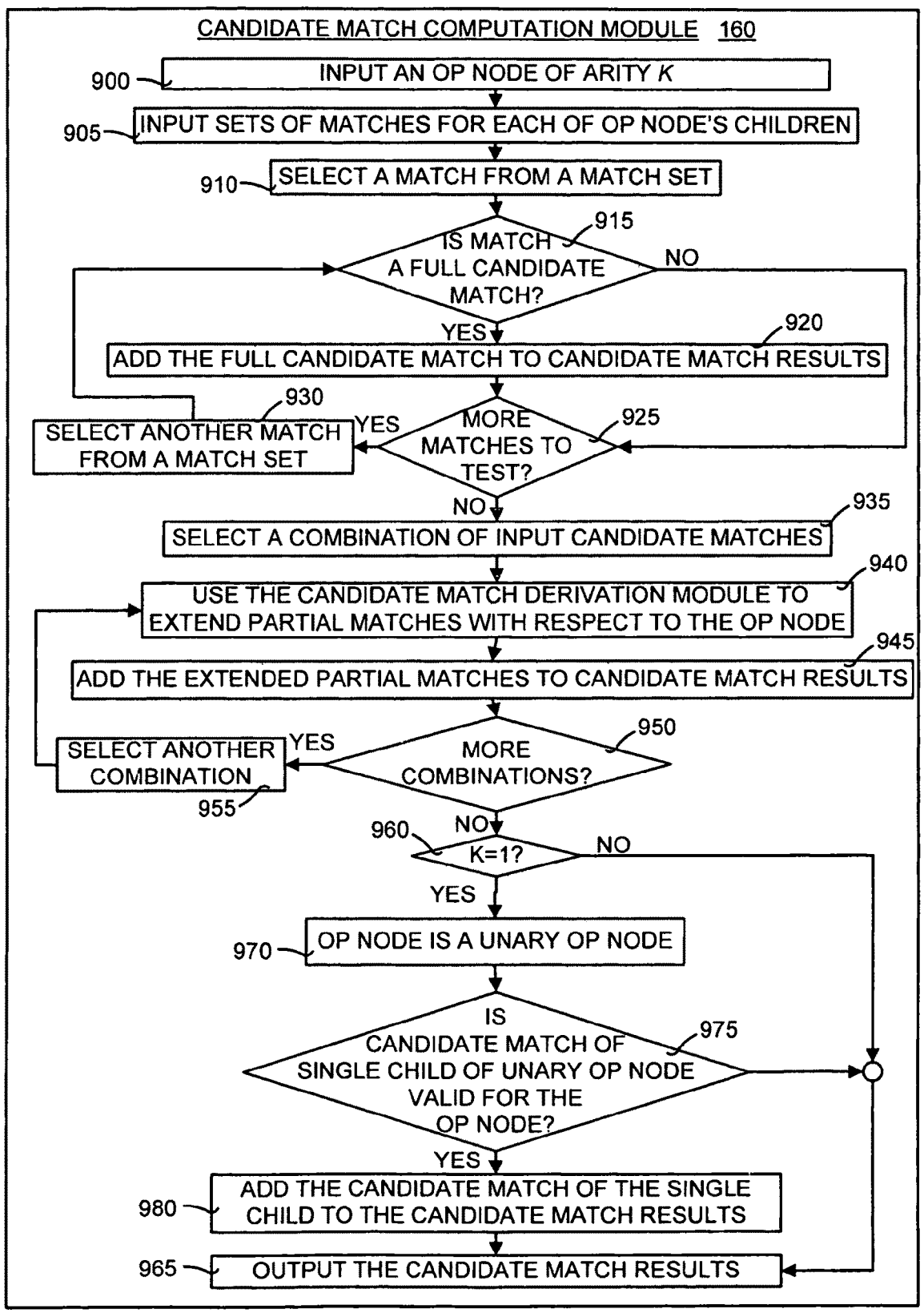
FIG. 9 is a flow diagram illustrating the detailed operation of embodiments of the candidate match computation module shown in FIG. 1.

Each operator in an execution plan may have multiple candidate matches (such as the Scan(R) node 700 in FIG. 7). The candidate match computation module 160 can be used to propagate candidate matches bottom up in an execution plan. FIG. 9 is a flow diagram illustrating the detailed operation of embodiments of the candidate match computation module 160 shown in FIG. 1. In particular, the operation of embodiments of the candidate match computation module 160 initially input an OP node of arity K (box 900). Note that K is rarely larger than two. In addition, the module 160 inputs set of matches from each of the OP node children (box 905). A match then is selected from an input match set (box 910). The module 160 then determines whether the match under consideration is a full candidate match (box 915). If so, then the module 160 adds the full candidate match to a set of candidate match results (box 920).

If not, then module 160 determines whether there are additional matches to test (box 925). If so, then another match is selected from a match set (box 930) and the process actions 915, 920, and 925 are iterated over again. Otherwise, the module selects a combination of input candidate matches (box 935). For each combination of input candidate matches, the module 160 uses the candidate match derivation module 150 to extend partial matches with respect to the input OP node (box 940). These extended partial matches are added to the set of candidate match results (box 945). A determination is made as to whether there are additional combinations to be examined (box 950). If so, then another combination is selected (box 955) and the process action 940, 945, and 950 are iterated over again.

The module 160 then makes the determination as to whether the value of the OP node arity K is one (box 960). If not, then the set of candidate match results is output (box 965). If so, this means that the OP node is a unary OP node (box 970). It should be noted that even if a unary operator in the execution plan can be extended by the candidate match derivation module 150, the same operator can still share its child matches. However, this is not the case for non-unary operators, since the resulting execution plan would contain additional leaf nodes.

The module 160 then checks whether the candidate match of a single child of the unary OP node is still valid for the OP node (box 975). If not, then the set of candidate match results is output (box 965). If so, then the candidate match of the single child is added to the set of candidate match results (box 980). Then the set of candidate match results is output (box 965).

III.C.3. Extended Optimizer

This section describes how the candidate match derivation module 150 and the candidate match computation module 160 are used by the extended optimizer 130 to find a query execution plan that has the lowest cost while still satisfying the constraints of the Phints expression.

III.C.3.a. Interesting Candidate Matches

In general, the system 100 keeps a set of equivalent query execution plans that are non-comparable with respect to their respective matches. Specifically, the system 100 desires an operator which, given a set of execution plans associated with a given OR node, returns the subset of "non-comparable" alternatives. This is known as the "skyline" operator. For a set P and a partial order $\leq$, is defined as {p$\in$P such that for all $p_j \in P$: $p_j \leq p$}. The system 100 uses the following partial order for comparing plans $P_1$ and $P_2$:

$$P_1 \leq P_2 \text{ if } P_1.\text{matches} \leq P_2.\text{matches OR}$$
$$( P_1.\text{matches} = P_2.\text{matches AND}$$
$$P_1.\text{cost} \leq P_2.\text{cost} ),$$

which in turn depends on a partial order for candidate matches.

Consider sets of matches $M_1$ and $M_2$. It is said that $M_1 \leq M_2$ if for each match $m_1 \in M_1$ there exists a match $m_2 \in M_2$ such that $m_1 < m_2$. In turn, this definition is based on a third partial order between individual matches. Given two matches $m_1 = (s_1, c_1)$ and $m_2 = (s_2, c_2)$ it can be said that $m_1 \leq m_2$ if the following are true: (i) $s_1$ is an ancestor of $s_2$; or, (ii) $s_1 = s_2$ and $c_1 \subset c_2$.

The partial order described above requires the system 100 to keep track of multiple execution plans for a given root OP node. For that purpose, the system 100 uses the concept of an extended OP node. The extended OP node is a special kind of OP node that has the following properties: (i) it is additionally associated with a set of candidate matches; and, (ii) its children are extended OP nodes themselves. The same OP node A in the original planSpace graph might now be associated with multiple extended OP nodes, each one binding to different execution plans (with the same root A) and different sets of candidate matches.

III.C.3.b. Operation of the Extended Optimizer

Figure 10:
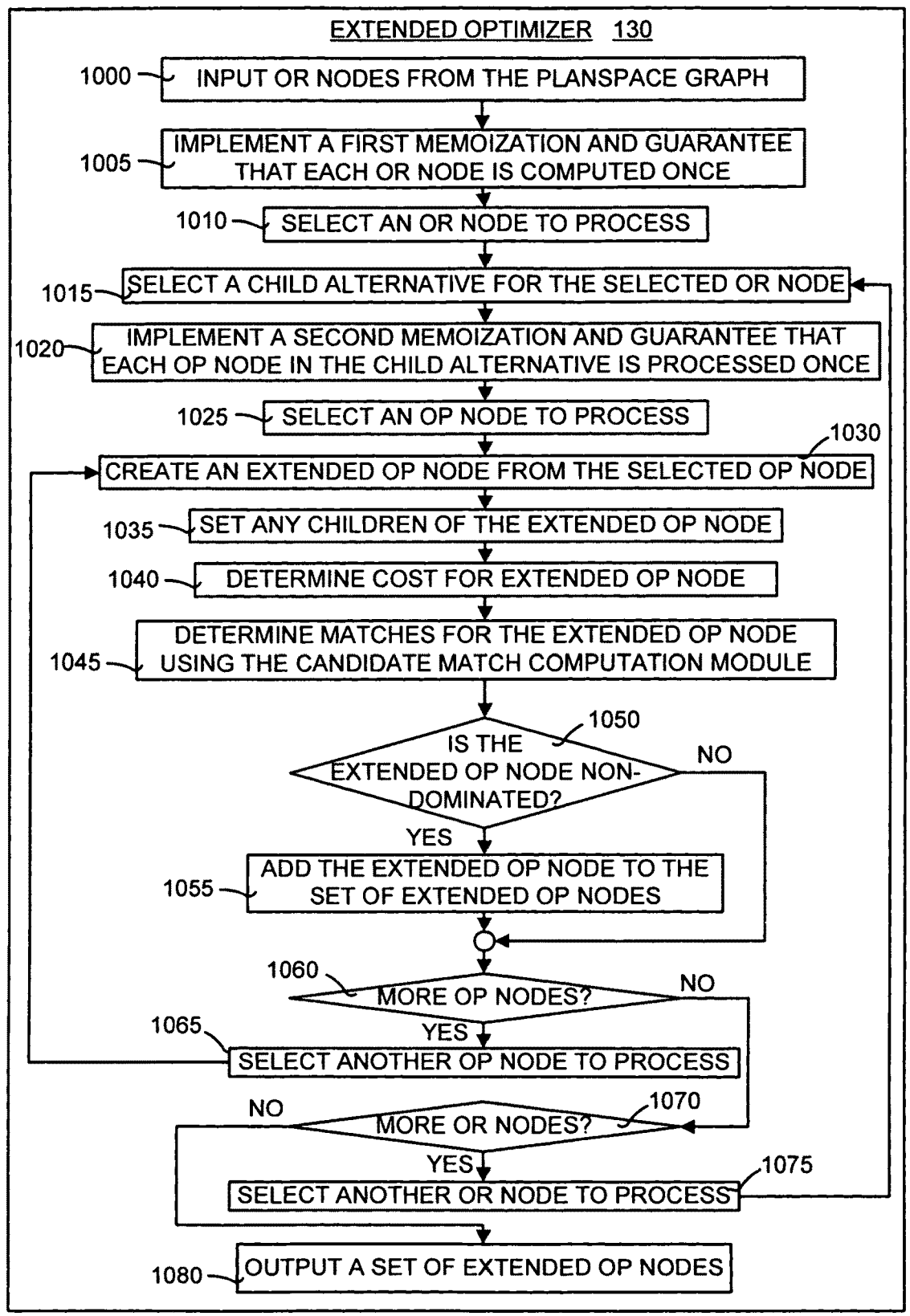
FIG. 10 is a flow diagram illustrating the detailed operation of embodiments of the extended optimizer shown in FIG. 1.

In general, embodiments of the extended optimizer 130 takes as input an OR node in the planSpace graph and return a set of extended OP nodes, where each one extended OP nodes is incomparable with respect to the set of candidate matches they satisfy. FIG. 10 is a flow diagram illustrating the detailed operation of embodiments of the extended optimizer 130 shown in FIG. 1. Embodiments of the operation of the optimizer 130 begin by input OR nodes from the planSpace graph (box 1000).

Next, the optimizer 130 implements a first memorization to guarantee that each OR node is computed once (box 1005). An OR node then is selected for processing (box 1010). In addition, a child alternative is selected for the selected OR node (box 1015). The optimizer 130 then implements a second memorization and guarantees that each OP node in the child alternative is processed once (box 1020).

The optimizer 130 then creates an extended OP node from the selected OP node (box 1030). The optimizer 130 then sets any children of the extended OP node (box 1035), and determines a cost for the extended OP node (box 1040). In addition, the optimizer 130 determines matches for the extended OP node using the candidate match computation module 160 (box 1045).

A determination then is made as to whether the extended OP node is non-dominated (box 1050). If so, then the extended OP node is added to the set of extended OP nodes (box 1055). Next, a determination is made as to whether there are more OP nodes to process (box 1060). If so, then another OP node is selected for processing (box 1065), and the process action 1030, 1035, 1040, 1045, 1050, 1055, and 1060 are iterated over again. Otherwise, the optimizer 130 determines whether there are more OR nodes to process (box 1070). If so, then another OR node is selected for processing (box 1075) and process actions 1015, 1020, 1025, 1030, 1035, 1040, 1045, 1050, 1055, 1060, 1065, and 1070 are iterated over again. Otherwise, the optimizer 130 outputs a set of extended OP nodes (box 1080).

III.D. Flexible Query Hints User Interface

When the user (typically a database administrator is satisfied with a query execution plan for the problematic query, the system 100 generates a description of such plan to be passed to the optimizer 130. The plan is presented to the user in a graphical manner.

Figure 11:
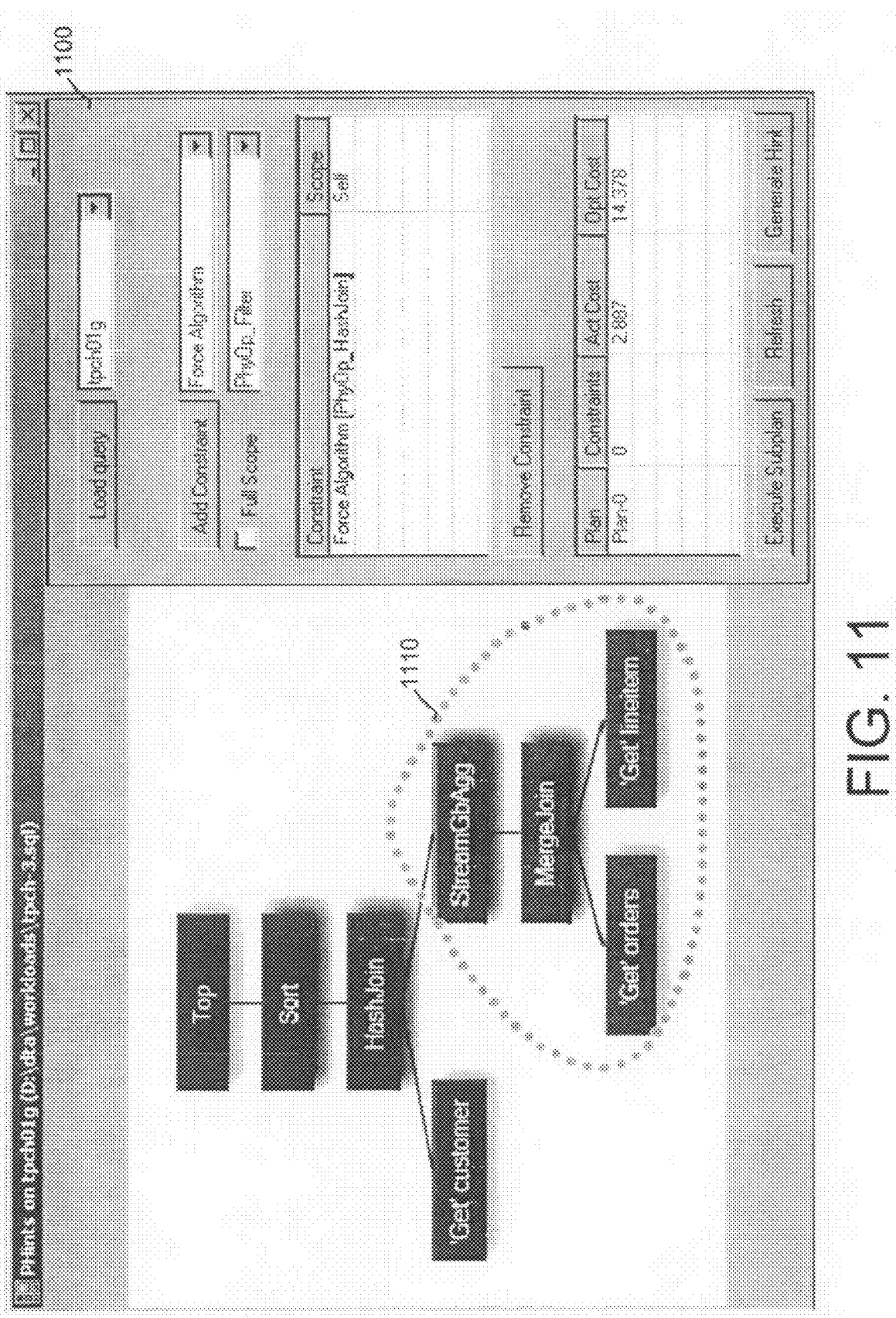
FIG. 11 is an exemplary implementation of the flexible query hints user interface shown in FIG. 1.

FIG. 11 is a exemplary implementation of the flexible query hints user interface 180 shown in FIG. 1. In particular, FIG. 11 illustrates a graphical user interface 1100 that uses a visual paradigm to create constraints, which are then translated into Phints expressions. For instance, the execution subplan in FIG. 11 that is circle by the dotted line 1110 corresponds to the Phints tree expression:

StreamGBAgg(MergeJoin[orders, lineitem]).

Resulting execution plans can be evaluated and compared, and the system 100 has the ability to generate fully specified hints for use in production environments.

III.E. Alternate Embodiments

Alternate embodiments of the flexible query hints system 100 and method now will be discussed.

III.E.1. Extensions to Matching Semantics

The matching semantics for Phints expressions discussed above required that each leaf node in an execution subplan P matches a leaf node in the tree pattern S. In fact, any leaf node in an execution plan that satisfies the self-constraint and the subtree constraints of an expression leaf node is deemed a valid match.

In alternate embodiments, this notion is relaxed, which allows increased flexibility in the Phints language. Specifically, this allows the possibility of matching whole execution subplans, as well as the ability to support access-path related hints. Suppose that, at least conceptually, an explicit set of candidate nodes in the planSpace (not necessarily leaf nodes) is associated with a leaf node in a Phints expression. Further, denote such set of candidate nodes for a pattern S as the virtual leaf nodes for S. Then, this embodiments changes the first condition in the matching semantics of Phints expressions from:

1) For each leaf node s in S, M(s) is a leaf node in P (and those are the only leaf nodes in P);

to:

1) For each leaf node s in S, M(s) is a virtual leaf node in P for s, and if we remove any subtree of a virtual leaf node in the execution plan, those virtual leaf nodes become the only leaf nodes in P.

Now, the implementation of the candidate match computation module 160 shown in FIG. 9 needs to be slightly modified by adding, to the resulting set of matches of an OP node n, leaf candidate matches for all nodes s in Phints expressions for which the following is true: (i) n is a virtual leaf node of s; and, (ii) n satisfies all self-constraint and subtree-constraints of s. Of course, if all leaf nodes in the planSpace graph are associated as virtual leaf nodes of every leaf node in Phints expressions, the this is the same as the embodiments previously described above. However, virtual leaf nodes enable additional functionality to the basic query model, as is discussed next.

III.E.2. Access-Path Hints

Virtual leaf nodes are important when additionally dealing with index strategies. As a simple example, consider the Phints expression:

HashJoin[R, S].

Suppose that there is an execution plan that uses an index intersection to obtain the required tuples in R, and therefore looks like:

HashJoin(Intersection($I_R^1$, $I_R^2$), S).

Unfortunately, this plan would not match the Phints expression because there would be an additional leaf node (either $I_R^1$ or $I_R^2$) which would violate the first matching condition as given above. To address these scenarios, some embodiments rely on the concept of virtual leaf nodes as follows. Consider a leaf node s in a Phints expression that has a self-constraint of the type forceTable(T). In this situation, all nodes in the planspace graph are obtained that correspond to execution subplans over T alone, and those nodes are associated as the virtual leaf nodes for s. This concept makes possible to match any execution plan p that returns tuples from a table T (using sequential scans, index intersections, or other alternatives) to a leaf expression node s that has a constraint of type forceTable(T).

To fully enable access-path hints, some embodiments add another predicate to the self-constraints of an expression node. In particular, by specifying forceIndex(I), where I is an index name, an expression node s would only match nodes that exploit such index in the plan. The following examples will help clarify these issues:
1. *(R, S) would match any single-table subplan over R joining any single-table subplan over S.
2. *(Intersection [$I_R^1$, R], S) would additionally require that the subplan over R is an intersection plan that uses index $I_R^1$ (note the concise representation of forceIndex constraints, similar to those for forceTable constraints). The second child of the Intersection node is again R, meaning that any single-table execution plan over R would match, such as another index scan to intersect with $I_R^1$, or even the result of intersecting multiple such indexes.

III.E.3. Matching Subexpressions

Consider the Phints expression HashJoin[R,*], which matches a binary join between R and a single additional table. If it is desirable to have R truly be a prefix in the execution plan, the expression as HashJoin[R,*, . . . ,*] needs to be extended with as many * symbols as remaining tables in the query.

Alternatively, some embodiments express this more concisely as:

HashJoin[R, *], where the special symbol * allows matching of an arbitrary execution subplan. To enable such scenarios, some embodiments of the system 100 assign to an expression leaf node marked as * all nodes in the planSpace graph as its virtual leaf nodes, which results in the desired matches.

IV. Exemplary Operating Environment

Embodiments of the flexible query hints system 100 and method are designed to operate in a computing environment. The following discussion is intended to provide a brief, general description of a suitable computing environment in which embodiments of the flexible query hints system 100 and method may be implemented.

Figure 12:
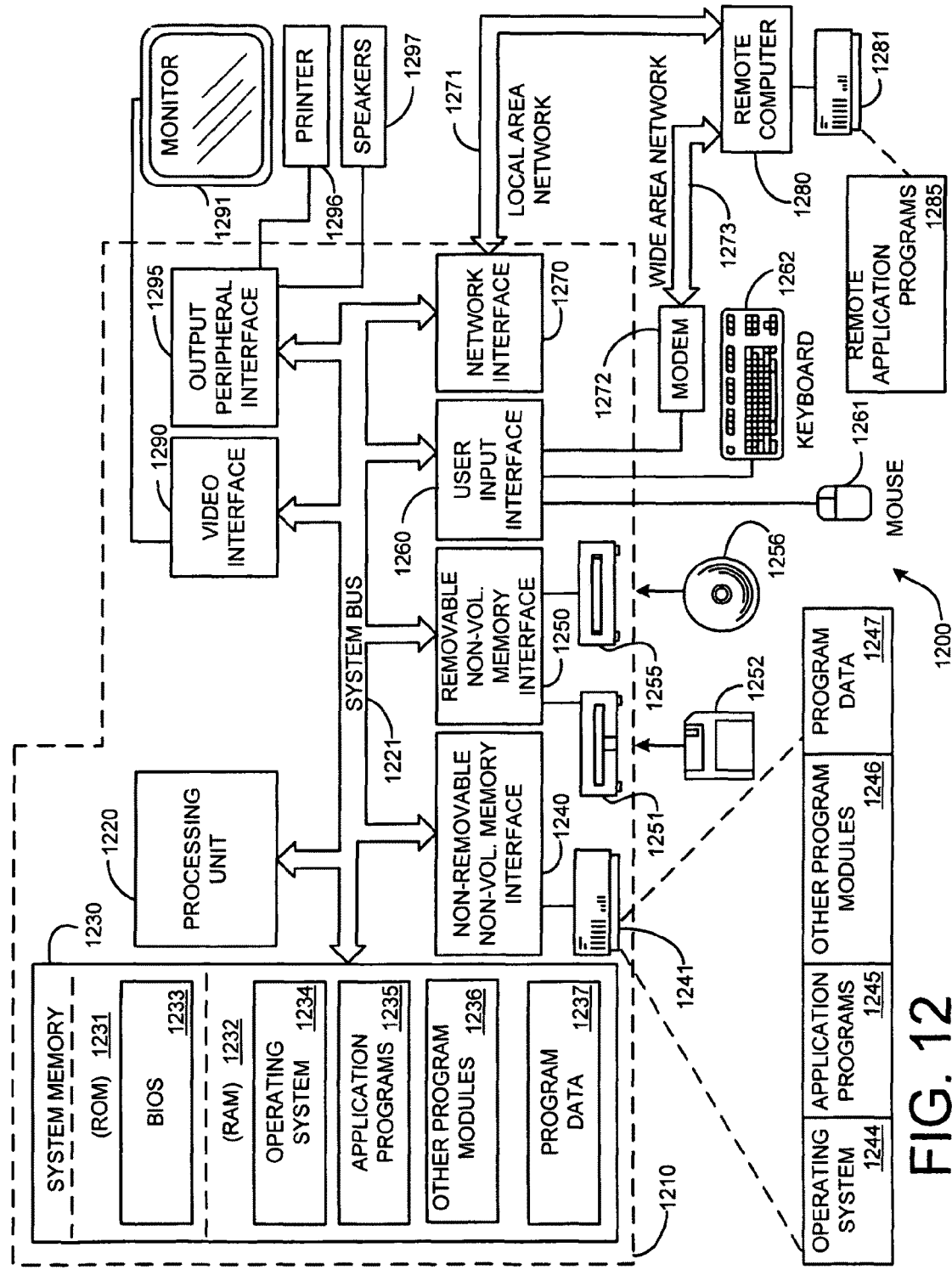
FIG. 12 illustrates an example of a suitable computing system environment in which embodiments of the flexible query hints system and method shown in FIGS. 1-11 may be implemented.

FIG. 12 illustrates an example of a suitable computing system environment in which embodiments of the flexible query hints system and method shown in FIGS. 1-11 may be implemented. The computing system environment 1200 is only one example of a suitable computing environment and is not intended to suggest any limitation as to the scope of use or functionality of the invention. Neither should the computing environment 1200 be interpreted as having any dependency or requirement relating to any one or combination of components illustrated in the exemplary operating environment.

Embodiments of the flexible query hints system 100 and method are operational with numerous other general purpose or special purpose computing system environments or configurations. Examples of well known computing systems, environments, and/or configurations that may be suitable for use with embodiments of the flexible query hints system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the flexible query hints system 100 and method may be described in the general context of computer-executable instructions, such as program modules, being executed by a computer. Generally, program modules include routines, programs, objects, components, data structures, etc., that perform particular tasks or implement particular abstract data types. Embodiments of the flexible query hints system 100 and method may also be practiced in distributed computing environments where tasks are performed by remote processing devices that are linked through a communications network. In a distributed computing environment, program modules may be located in both local and remote computer storage media including memory storage devices. With reference to FIG. 12, an exemplary system for embodiments of the flexible query hints system 100 and method includes a general-purpose computing device in the form of a computer 1210.

Components of the computer 1210 may include, but are not limited to, a processing unit 1220 (such as a central processing unit, CPU), a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1210 typically includes a variety of computer readable media. Computer readable media can be any available media that can be accessed by the computer 1210 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1210. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1240 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within the computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable, volatile/nonvolatile computer storage media. By way of example only, FIG. 12 illustrates a hard disk drive 1241 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface, such as interface 1250.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237. Operating system 1244, application programs 1245, other program modules 1246, and program data 1247 are given different numbers here to illustrate that, at a minimum, they are different copies. A user may enter commands and information (or data) into the computer 1210 through input devices such as a keyboard 1262, pointing device 1261, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 1220 through a user input interface 1260 that is coupled to the system bus 1221, but may be connected by other interface and bus structures, such as, for example, a parallel port, game port or a universal serial bus (USB). A monitor 1291 or other type of display device is also connected to the system bus 1221 via an interface, such as a video interface 1290. In addition to the monitor, computers may also include other peripheral output devices such as speakers 1297 and printer 1296, which may be connected through an output peripheral interface 1295.

The computer 1210 may operate in a networked environment using logical connections to one or more remote computers, such as a remote computer 1280. The remote computer 1280 may be a personal computer, a server, a router, a network PC, a peer device or other common network node, and typically includes many or all of the elements described above relative to the computer 1210, although only a memory storage device 1281 has been illustrated in FIG. 12. The logical connections depicted in FIG. 12 include a local area network (LAN) 1271 and a wide area network (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user input interface 1260, or other appropriate mechanism. In a networked environment, program modules depicted relative to the computer 1210, or portions thereof, may be stored in the remote memory storage device. By way of example, and not limitation, FIG. 12 illustrates remote application programs 1285 as residing on memory device 1281. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method implemented on a general-purpose computing device for discovering and expressing query hints in a database management system, comprising:
using the general-purpose computing device to perform the following:
input a query having an initial query execution plan;
computing a direct acyclic graph for the query;
constraining the query using a power hints query language expression that is appended to the query and contains a predicate;
computing candidate matches for each operator in the initial execution plan;
enumerating possible query execution plans in the directed acyclic graph and filtering out any of the possible query execution plans that do not match the power hints language expression to obtain filtered possible query execution plans;
extracting a revised query execution plan that is a revision of the initial query execution plan, the revised query execution plan being one of the filtered possible query execution plans having a lowest cost as determined by a query optimizer cost model that satisfies constraints of the power hints query language expression;
displaying the revised query execution plan in a graphical manner to a user; and
allowing the user to change the revised query execution plan if the user is not satisfied with the revised query execution plan.

2. The method of claim 1, further comprising deriving the candidate matches for subplans of a given execution plan using the power hints query language expression and the direct acyclic graph.

3. The method of claim 2, further comprising:
inputting an operator in an execution plan that is an OP node having arity K;
inputting matches for children of the OP node to obtain fully-matched OP node children; and
promoting each of the fully-matched OP node children into an equivalent form in terms of the OP node to obtain transformed matches.

4. The method of claim 3, further comprising:
determining whether each of the transformed matches partially match the same tree pattern;
if not, then determining that no candidate match can be derived; and if so, then determining whether the same candidate match is returned by multiple OP node children.

5. The method of claim 4, further comprising:
if the same candidate match is not returned by multiple OP node children, then determining that no unique matching is possible and that no candidate match can be derived; and
if the same candidate match is returned by multiple OP node children, then assembling a result by concatenating candidate matches for each of the OP node children.

6. The method of claim 5, further comprising:
determining whether the OP node satisfies subtree constraints of a tree pattern of the result;
if not, then determining that no unique matching is possible and that no candidate match can be derived; and
if so, then determining that a tree pattern of the result has a constraint on an order.

7. The method of claim 6, further comprising:
determining whether the order is satisfied by the OP node and its subtrees;
if not, then determining that no unique matching is possible and that no candidate match can be derived; and
if so, then determining that the result is a full match.

8. The method of claim 7, further comprising:
determining whether self-constraints of the result tree pattern are satisfied;
if not, then determining that no unique matching is possible and that no candidate match can be derived; and
if so, then outputting a valid candidate match for the OP node.

9. The method of claim 2, further comprising:
inputting an OP node of arity K;
inputting sets of matches for each child of the OP node;
selecting a match from a match set; and
testing the selected match set to determine whether the selected match is a full-candidate match.

10. The method of claim 9, further comprising:
if the selected match is a full-candidate match, then adding the full-candidate match to candidate match results; and
testing each match set in the sets of matches to determine whether each match set match is a full-candidate match.

11. The method of claim 10, further comprising:
selecting a combination of input candidate matches;
using the derived candidate matches to extend partial matches with respect to the OP node; and
adding the extended partial matches to the candidate match results.

12. The method of claim 11, further comprising:
determining that K=1;
designating the OP node as a unary OP node; and
determining whether the candidate match of a single child of the unary OP node is valid for the OP node.

13. The method of claim 12, further comprising:
determining that the candidate match of a single child of the unary OP node is valid for the OP node; and
adding the candidate match of the single child to the candidate match results.

14. A computer-implemented method for revising an initial query execution plan for a query in a database management system on the computer, comprising:
using the computer to perform the following:
computing a direct acyclic graph for the query;
defining a power hints language where expressions in the power hints language are tree patterns in the acyclic graph annotated with constraints;
constraining the query using a power hints language expression that is appended to the query and contains a predicate;
enumerating each of the possible query execution plans in the direct acyclic graph;
filtering out the possible query execution plans that do not match the power hints language expression; and
finding a matching query execution plan have a lowest estimated cost to determine a revised query execution plan, which is a revision of the initial query execution plan for the query.

15. The method of claim 14, further comprising:
defining a subplan, P, in the direct acyclic graph; and
determining that the subplan, P, matches a tree pattern, S, of the power hints query language expression if there is a mapping, M, between nodes in the tree pattern, S, and distinct OP nodes in the subplan, P, such that for each leaf node, s, in the tree pattern, S, a mapping of the leaf node, M(s), is a matching leaf node in the subplan, P, and that those are the leaf nodes in the subplan, P.

16. The method of claim 15, further comprising determining that the subplan, P, matches a tree pattern, S, of the power hints query language expression if there is a mapping, M, between nodes in the tree pattern, S, and distinct OP nodes in the subplan, P, such that for each leaf node, s, in the tree pattern, S, with children $\{s_i, \ldots, s_k\}$, every mapping of the children, $M(s_i)$, is a descendant of the mapping of the leaf node, M(s), and no mapping of the children, $M(s_i)$, is a descendant of $M(s_j)$ for i≠j; and such that for each leaf node, s, in the tree pattern, S, the leaf node mapping, M(s), and its descendants in the subplan, P, must satisfy the constraints defined on the leaf node, s.

17. The method of claim 15, further comprising:
specifying the power hints language expression as follows:
writing the tree pattern, S, in an infix order, where parenthesis are used to denote parent-child relationships and square brackets are used if an order constraint is present in the parent node;
denoted a node with the symbol "*" if there are no self constraints;
if there are self constraints, then denoting the node with an "A" such that "force(A)" is used to denote a self-constraint, "!A" is used to denote a disable(A) self-constraint, "T" is used to denote a forceTable(T) constraint, and "L=>P" is used to denote a condForce(L, P) constraint; and
subtree constraints are written in curly braces next to the node description.

18. The method of claim 14, further comprising:
presenting the revised query execution plan to a user in a graphical manner on a flexible query hints user interface;
determining whether the user is satisfied with the revised query execution plan;
if the user is not satisfied, then allowing the user to create another power hints language expression to further constrain the query; and
continuing the process of presenting the revised query execution plan to the user, determining whether the user is satisfied, and, if not, creating another power hints language expression until the user is satisfied.

19. A computer-implemented process contained on a computer-readable storage media having stored and encoded thereon computer-executable instructions for execution on a general-purpose computing device for incorporating query hints into a query optimizer of a database management system, comprising:

using the general-purpose computing device to perform the following process actions:

inputting a query;

computing a directed acyclic graph for the query;

creating a power hints language expression using a power hints language;

constraining the query using the power hints language expression that is appended to the query and contains a predicate;

deriving candidate matches for subplans of an execution plan for the query using the power hints language expression and the directed acyclic graph; inputting OR nodes from the directed acyclic graph; implementing a first memoization to guarantee that each OR node is computed once;

selecting an OR node to process and a child alternative for the selected OR node;

implementing a second memoization to guarantee that each OP node in the child alternative is processed once;

selecting an OP node to process; creating an extended OP node from the selected OP node;

setting any children of the extended OP node;

determining cost for the extended OP node;

computing candidate matches for the extended OP node from the derived candidate matches; and extracting a revised query execution plan having a lowest cost and satisfying constraints given the power hints language expression.

20. The computer-implemented process of claim 19, further comprising:

determining whether the extended OP node is a non-dominated node; and if so, then adding the extended OP node to a set of extended OP nodes to aid in extracting the revised query execution plan.

* * * * *